US006412830B1

(12) United States Patent
Akiyama et al.

(10) Patent No.: US 6,412,830 B1
(45) Date of Patent: Jul. 2, 2002

(54) STRUCTURE OF SMALL-DIAMETER RESIN TUBE CONNECTOR

(75) Inventors: Masaaki Akiyama, Sunto-gun; Kazumi Fukaya, Mishima; Yukinori Sugiyama, Gotenba; Hiroaki Kondo, Numazu, all of (JP)

(73) Assignee: Usui Kokusai Sangyo Kaisha Limited (JP)

( * ) Notice: Subject to any disclaimer, the term of this patent is extended or adjusted under 35 U.S.C. 154(b) by 0 days.

(21) Appl. No.: 09/452,405

(22) Filed: Dec. 1, 1999

(30) Foreign Application Priority Data

Dec. 4, 1998 (JP) .......................................... 10-345908

(51) Int. Cl.$^7$ ................................................ F16L 39/00
(52) U.S. Cl. ........................... 285/319; 285/55; 285/239
(58) Field of Search ................................. 285/319, 239, 285/246, 122.1, 423, 233, 55, 222

(56) References Cited

U.S. PATENT DOCUMENTS

| 4,069,573 A | * | 1/1978 | Rogers, Jr. et al. ....... 29/421 R |
| 4,730,856 A | | 3/1988 | Washizu |
| 4,776,616 A | | 10/1988 | Umehara et al. |
| 4,895,396 A | | 1/1990 | Washizu |
| 4,913,467 A | | 4/1990 | Washizu |
| 4,915,420 A | | 4/1990 | Washizu |
| 4,944,537 A | | 7/1990 | Usui et al. |
| 4,946,205 A | | 8/1990 | Washizu |
| 4,948,180 A | | 8/1990 | Usui et al. |
| 4,964,658 A | | 10/1990 | Usui et al. |
| 4,972,216 A | | 11/1990 | Washizu |
| 5,048,875 A | | 9/1991 | Usui et al. |
| 5,090,748 A | | 2/1992 | Usui et al. |
| 5,094,481 A | | 3/1992 | Takikawa et al. |
| 5,098,136 A | | 3/1992 | Washizu |
| 5,112,084 A | | 5/1992 | Washizu |
| 5,114,250 A | | 5/1992 | Usui |
| 5,127,682 A | | 7/1992 | Washizu |
| 5,131,691 A | | 7/1992 | Washizu |
| 5,141,264 A | | 8/1992 | Usui |
| 5,154,450 A | | 10/1992 | Washizu |

(List continued on next page.)

FOREIGN PATENT DOCUMENTS

| GB | 002264992 | * | 9/1992 | ................. 285/319 |
| JP | 406050482 | * | 2/1994 | ................. 285/319 |

*Primary Examiner*—Lynne H. Browne
*Assistant Examiner*—Kenn Thompson
(74) *Attorney, Agent, or Firm*—Anthony J. Casella; Gerald E. Hespos

(57) ABSTRACT

A small-diameter resin tube connecting structure used as a small-diameter tube connector is provided. The connector comprises: a main body including therein a small-diameter chamber continuous with a communication hole defined by the connecting cylindrical wall at the top end of the main body and a large-diameter chamber formed behind the small-diameter chamber; and a socket having repulsive walls each in the form of a pawl wall and formed integral with, or separately from, the outer periphery of the connector main body whereby the repulsive walls of the socket are brought into engagement with an annular bulged wall of the target resin tube. Further, a thin-wall metallic tube having an annular bulged wall is inserted into at least the connecting end of the resin tube with the metallic tube serving as a reinforcing member for the resin tube. The resin tube may have the annular bulged wall together with the metallic tube by press-working the inserted metallic tube in the axial direction. The connector of the present invention can securely maintain the connection of the target small-diameter tube with the connector for a prolonged period of time, increase the resistance against the draw-out force and manufacture easily and in a simple manner without enlarging the size thereof.

7 Claims, 6 Drawing Sheets

U.S. PATENT DOCUMENTS

| | | |
|---|---|---|
| 5,154,451 A | 10/1992 | Washizu |
| 5,160,177 A | 11/1992 | Washizu |
| 5,163,719 A | 11/1992 | Washizu |
| 5,172,940 A | 12/1992 | Usui et al. |
| 5,176,412 A | 1/1993 | Washizu |
| 5,209,527 A * | 5/1993 | Hohmann et al. .......... 285/242 |
| 5,211,427 A | 5/1993 | Washizu |
| 5,322,331 A * | 6/1994 | Waldschmidt et al. ...... 285/259 |
| 5,324,081 A | 6/1994 | Umezawa |
| 5,328,216 A | 7/1994 | Miyauchi et al. |
| 5,338,073 A | 8/1994 | Washizu et al. |
| 5,354,106 A | 10/1994 | Washizu et al. |
| 5,575,512 A | 11/1996 | Umezawa |
| 5,580,100 A | 12/1996 | Umezawa et al. |
| 5,890,749 A | 4/1999 | Fukaya et al. |
| 5,988,692 A * | 11/1999 | Springer ...................... 285/55 |
| 6,199,919 B1 * | 3/2001 | Kawasaki et al. .......... 285/319 |
| 6,279,966 B1 * | 8/2001 | Kondo et al. ................ 285/319 |

\* cited by examiner

STRUCTURE OF SMALL-DIAMETER RESIN TUBE CONNECTOR

BACKGROUND OF THE INVENTION

1. Field of the Invention

The present invention relates generally to a connector for connecting a comparatively thin resin tube of a diameter less than about 40 mm to be used as an oiling or air supply path of an automobile or various kinds of machines and devices and more particularly to the structure of a small-diameter resin tube connector.

2. Description of Prior Art

Conventionally, various kinds of quick-connectors for connecting small-diameter tubes have been proposed and put to practical use. One example of them has the following structure. That is, as shown in FIG. 5, this connector comprises a cylindrical main body 21 which is provided with a small-diameter chamber 23-1 and a large-diameter chamber 23 which are continuous with a communication hole 24 defined by a flexible hose connecting cylindrical wall 22 at the top of the main body 21 and a separate socket 28 having a plurality of pawl walls 25 which are inwardly inclined toward the front portion of the outer peripheral wall defining an axial central hole. Further, the small-diameter chamber 23-1 has seal rings 26 and bushes 27 disposed therein and the large-diameter chamber 23 is provided with an engagement hole 21-1 drilled through the outer peripheral wall with the formation of a support wall 21-2 at the rear end thereof. The mechanism of the connector is such that the annular peripheral wall 25-2 of the rear end of the socket 28 is fitted into the connector main body 21 while the shoulder 25-1 of the base portion of each of the pawl walls 25 is held engaged with the edge of the engagement hole 21-1 whereby the pawl walls 25 of the socket 28 is brought into pressure-engagement with an annular bulged wall $P_0'$ of a tube $P_0$ assembled into the main body 21 in advance thereby connecting the tube $P_0$ to the connector.

As another example of such quick connector, there is a connector which is proposed by the present applicant and which is disclosed in the Japanese Unexamined Patent Publication No.H9-280451/1997(Japanese Patent Application No.H8-121063/1996). This connector has the following structure. That is, the connector has a main body provided a small-diameter chamber and a large-diameter chamber both of which are formed by expanding a communication hole extending through the connecting cylindrical wall of the flexible tube connecting end of the main body. The small-diameter chamber has seal rings and bushes disposed therein and the large-diameter chamber is provided with recessed windows formed through the outer peripheral wall of the chamber in opposite relationship with each other. Further, a socket having inwardly energized repulsive walls each in the form of a pawl wall projecting forward and including an inwardly-inclined intermediate portion and a projected wall extending over the outer periphery of the connector main body is formed integral with the connector main body whereby a tube is connected to the connector by bringing the repulsive walls into pressure-engagement with the annular bulged portion of the tube.

However, these conventional techniques have had the disadvantage that although no problem arises when the tube assembled into the connector is made of a metallic material since the annular bulged wall formed near the connecting end of the tube has a sufficient degree of mechanical strength, when the tube is made of a flexible resin material such as a polyamide type resin material and has an annular bulged wall formed by press working in the axial direction under a heated condition or by several steps of press working in the axial direction at the normal temperature, if a draw-out force is applied on the tube, even when the tube is made of a hard polyamide type resin not mixed with a plasticizer, the mechanical strength of the tube against the draw-out force is not sufficient so that the annular bulged wall becomes deformed to get out of engagement with the pawl walls or the repulsive walls of the socket and the tube is sometimes drawn out from the connector.

As a means for eliminating the above-described problem, there is a bite type small-diameter pipe connector as shown in FIG. 6. Such type of connector comprises a main body 31 including a small-diameter chamber 33' attached with a cylindrical insert 34 and having a seal ring 35 and a collet 36 having at the rear end thereof an inwardly inclined pawl wall 36' whose outer peripheral surface forms a projecting wall, a large-diameter chamber 33 having a stopper 37 attached thereto and a releasing member 38 capable of moving in the axial direction of the main body 31. With such an arrangement, when a resin tube $P_{0'}$ is inserted into the connector and then moved rearward, the tube comes into engagement with the stopper 37 at the projecting wall of the collet 36 so that the pawl wall 36' of the collet 36 is caused to bite into the outer peripheral surface of the tube while when such biting is desired to be released, the releasing member 38 may be pushed forward in the axial direction from outside.

However, such bite type small-diameter tube connector has the disadvantage that although it is resistant against the draw-out force applied to the resin tube $P_{0'}$, when a strong draw-out force is applied on the resin tube, the pawl wall 36' of the collet 36 comes to bite too deep into the tube which sometimes results in breaking the resin tube and further, since the stopper 37, the collet 36 and the releasing member 38 are disposed within the connector main body 31, the collector main body can not but become large-sized in the radial direction and as a result, the overall size of the product is forced to become large-sized failing to comply with the recent miniaturization requirement so that means for improving such connector has long been awaited.

The present invention has been made in view of the current state of tube connection by the small-diameter resin tube connecting structure used for the above-described conventional small-diameter tube connector.

Accordingly, an object of the present invention is to provide a small-diameter resin tube connecting structure for a small-diameter tube connector which connecting structure can securely maintain a favorable connecting condition for a prolonged period of time even when a conventional small diameter tube connecting quick connector is used as it is, can increase its resistance against a tube draw-out force applied on the connector, can manufacture easily and in a simple manner without the necessity of making the connector large-sized.

SUMMARY OF THE INVENTION

In order to achieve the above-described object of the invention, the invention provides a small-diameter tube connector comprising a main body including therein a small-diameter chamber formed by expanding a communication hole defined by a connecting cylindrical wall at the top end of the main body and having seal rings and bushes disposed therein, a large-diameter chamber formed in the same manner as the small-diameter chamber and having engagement holes or recessed windows formed through the outer peripheral wall thereof in opposite relationship with each other, a socket formed integrally with, or separately from, the main body of the connector and having inwardly energized repulsive walls at the engagement holes or the recessed windows, respectively, each being in the form of a pawl wall whereby the repulsive walls are brought into engagement with an annular bulged wall to be formed on the outer peripheral surface of a target resin tube to be connected. The characteristics of the invention reside with a small-diameter resin tube connecting structure in which a thin-wall metallic tube having an annular bulged wall portion is inserted into at least the connecting end of the resin tube with the metallic tube serving as a reinforcing member and also resides with the formation of an annular bulged wall on the outer peripheral surface of the resin tube by press-working the metallic tube in the axial direction.

BRIEF DESCRIPTION OF THE DRAWINGS

FIG. 4 shows how the small-diameter resin tube connecting structure according to the present invention is processed wherein FIG. 4(a) is an enlarged sectional view of a small-diameter resin tube after a thin-wall metallic tube is assembled and FIG. 4(b) is an enlarged sectional view of the end of the metallic tube subjected to a press-working process;

DETAILED DESCRIPTION OF PREFERRED EMBODIMENTS

Figure 1:
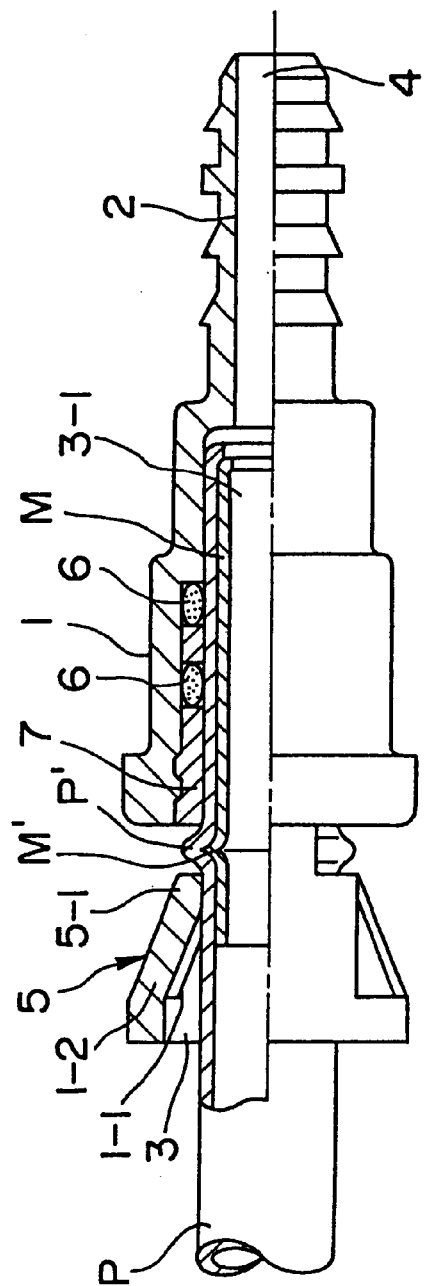
FIG. 1(a) is a side view (partly in section) of a small-diameter tube connector properly connected with a tube according to one embodiment of the present invention.
FIG. 1(b) is a rear end view of the connector shown in FIG. 1(a)
Figure 1:
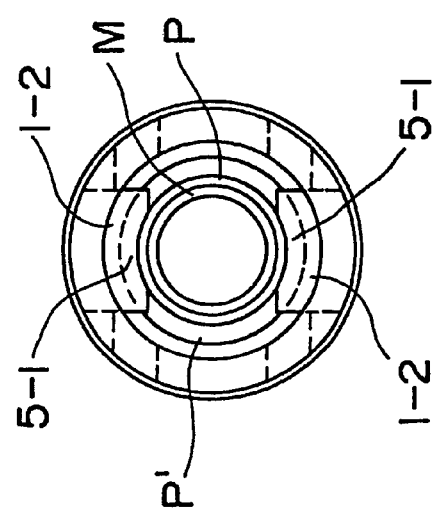

In the accompanying drawings, reference numeral 1 designates a connector main body made of a resin material or a metallic material. The connector main body 1 is provided with a small-diameter chamber 3-1 communicating with a communication hole 4 extending through a connecting cylinder which is formed at the top end of the connector body 1 defining a cylindrical inner wall 2 and into which a flexible hose (not shown) is to be inserted and a large-diameter chamber 3 formed behind the small-diameter chamber 3-1. The small-diameter chamber 3-1 has elastic seal rings 6 and cylindrical bushes 7 disposed therein. Further, a socket 5 having inwardly energized repulsive walls 1-2 is formed integral with the outer peripheral wall of the connector main body 1. Each of the repulsive walls 1–2 includes at the intermediate portion thereof a forwardly-projecting and inwardly-inclined pawl wall 5-1 formed at each of recessed windows 1—1 drilled through the outer peripheral wall of the large-diameter chamber 3 in opposite relationship with each other.

Figure 4:
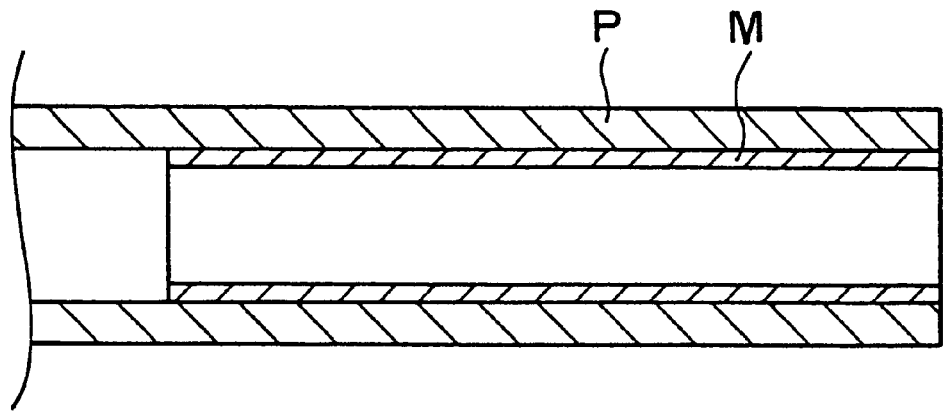
Figure 4:
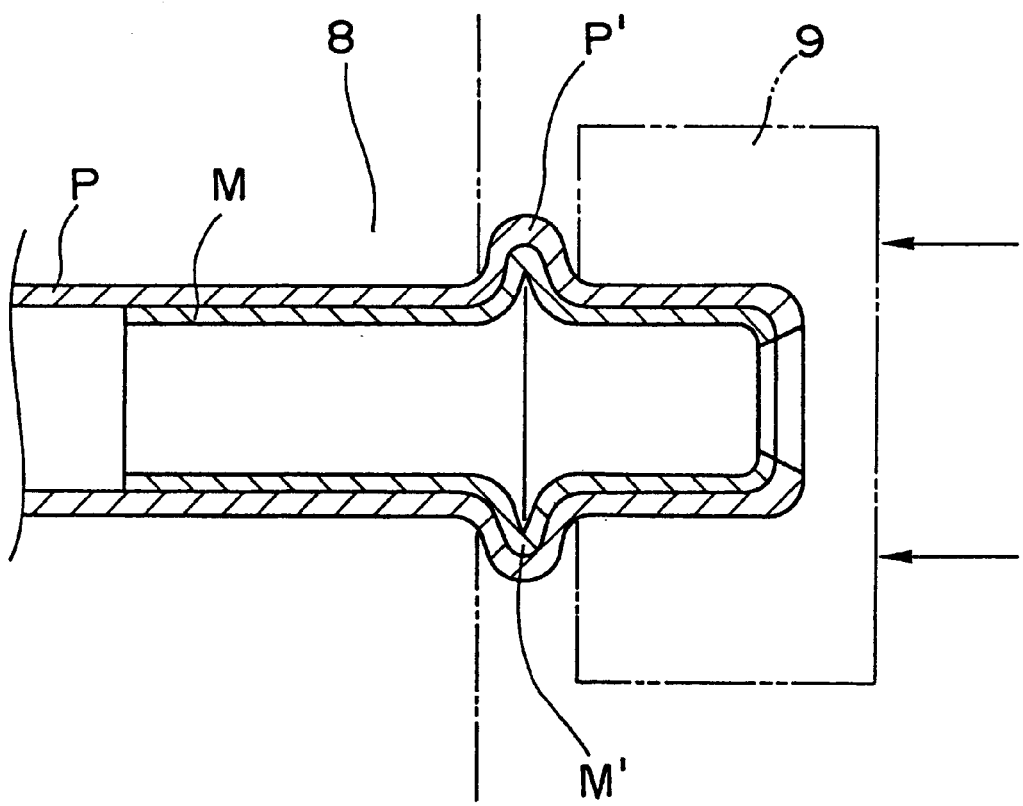

At the same time, a resin tube P has a thin-wall metallic tube M inserted therein at least at a position near its connecting end so as to form a double-layer structure with the formation of annular bulged walls P' and M', respectively. Now, let us describe a method of manufacturing the resin tube connecting structure according to the present invention by referring to FIG. 4.

Figure 2:
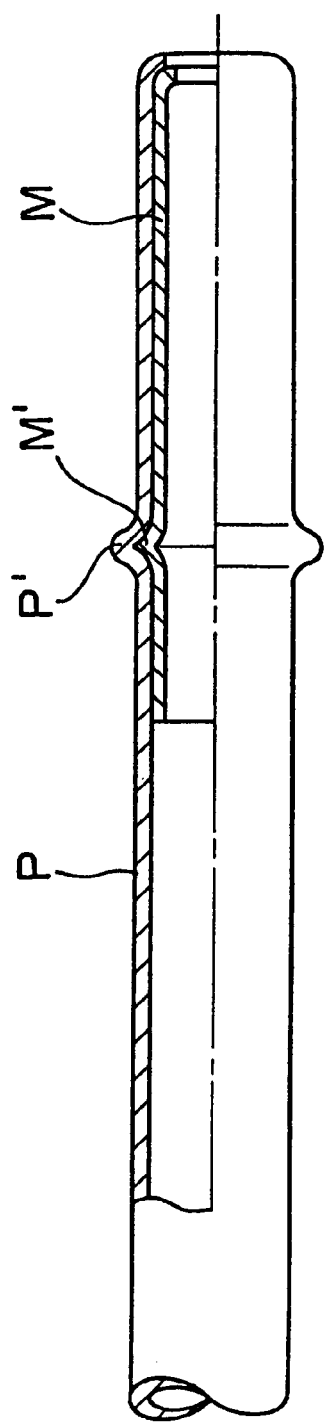
FIG. 2 is a longitudinal side view (partly in section) of the tube used in FIG. 1(a)

According to the present invention as shown in FIG. 4(a), where the resin tube P is manufactured, the thin-wall metallic tube M is inserted into the inner cylindrical peripheral surface of the tube P at a portion near the connecting end of the resin tube P by at least a length larger than the annular bulged wall P' from the top end thereof so as to cause the metallic tube M to come into contact with the inner wall of the tube P thereby providing a double-layer tube structure. Next, the resin tube P having such a double-layer structure is fixedly supported by a chuck 8 with the top end portion ahead of the annular bulged wall P' to be formed on the resin tube P serving as a working allowance. In this condition, the thin-wall metallic tube M and the annular bulged wall P' and M' of the resin tube P are simultaneously formed by a punch 9 from on the side of the top end by press-working the resin tube P and the thin wall metallic tube M in the axial direction thereby forming the resin tube as shown in FIG. 2.

In case where the above-described resin tube P having the thin-wall metallic tube M inserted therein with the formation of the annular bulged walls P' and M' is connected to the connector main body 1 at the assembling site, the top end of the resin tube P is inserted into the large-diameter chamber 3 of the connector main body 1, whereupon the repulsive walls 1-2 are caused to expand by the annular bulged wall P' of the resin tube P and when the annular bulged wall portion P' has passed over the repulsive walls 1-2 by keeping the insertion of the resin tube P continued, the repulsive walls 1-2 return to their original positions and the pawl walls 5-1 are brought into pressure-engagement with the annular bulged wall P' thereby completing the connecting operation.

Thus, when the pawl walls 5-1 are brought into pressure-engagement with the annular bulged wall P', since the inserted thin-wall metallic tube M has a certain degree of mechanical strength, even when a draw-out force is applied on the resin tube P, the deformation of the annular bulged wall portion P' of the resin tube P is prevented by the annular bulged wall portion M' of the thin metallic tube M which acts as a support having a high degree of rigidity, so that the resin tube P is prevented from being drawn out easily from the connector main body 1.

Figure 5:
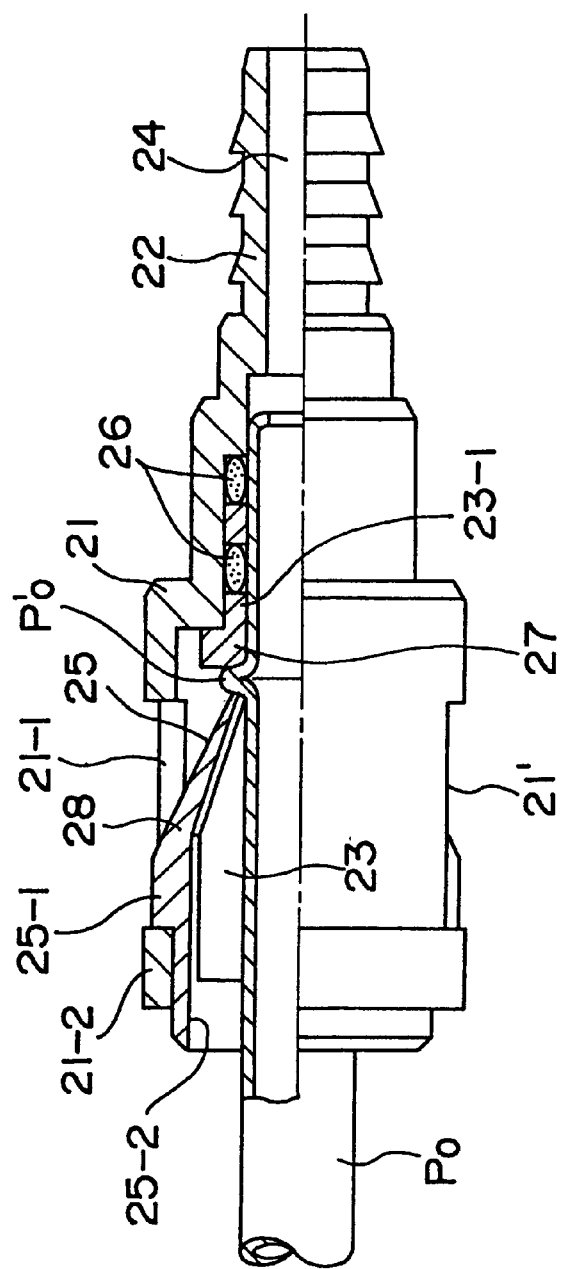
FIG. 5 is an illustrative sectional view of one example of a conventional tube connecting structure.
Figure 6:
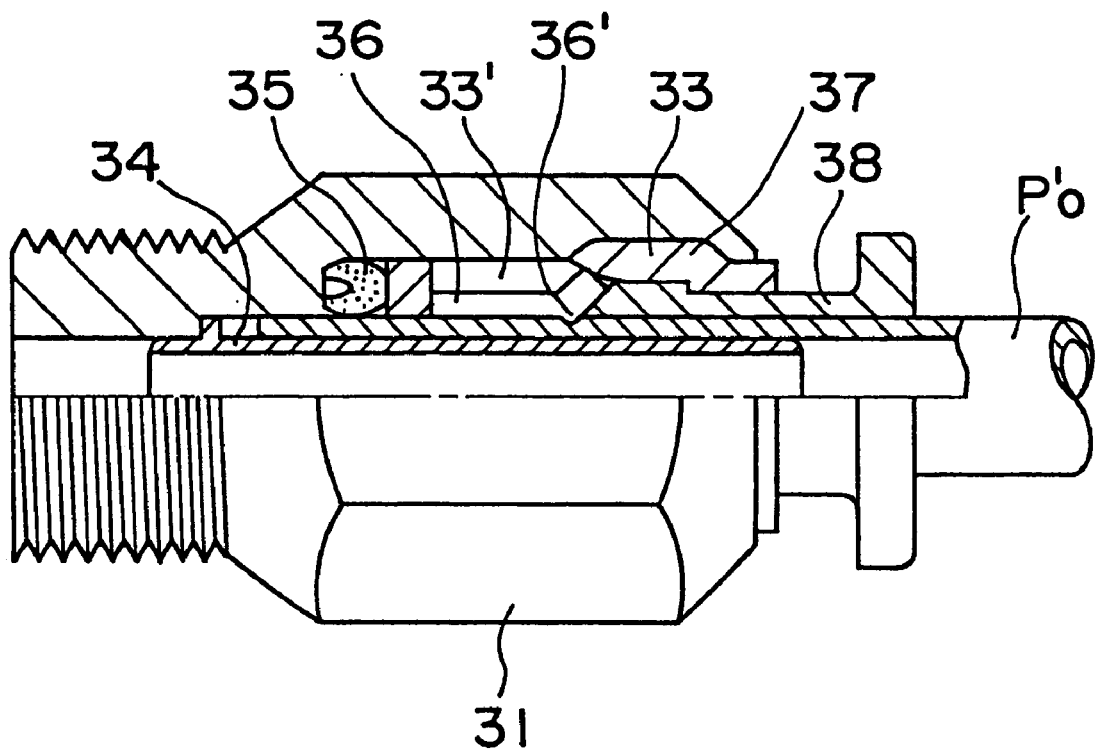
FIG. 6 is an illustrative sectional view of another example of a conventional tube connecting structure.

It should be noted that although, in the instant embodiment, the connector provided with the socket 5 which is formed integral with the connector main body 1 and which has inwardly repulsive walls 1-2 each having a forwardly projecting and inwardly-inclined pawl wall 5-1 formed at each of recessed windows 1-1 of the connector body, the present invention is applicable not only to such type of connector but also to the connector introduced under the sub-title of "the Description of Prior Art" of this specification with reference to FIG. 5.

Figure 3:
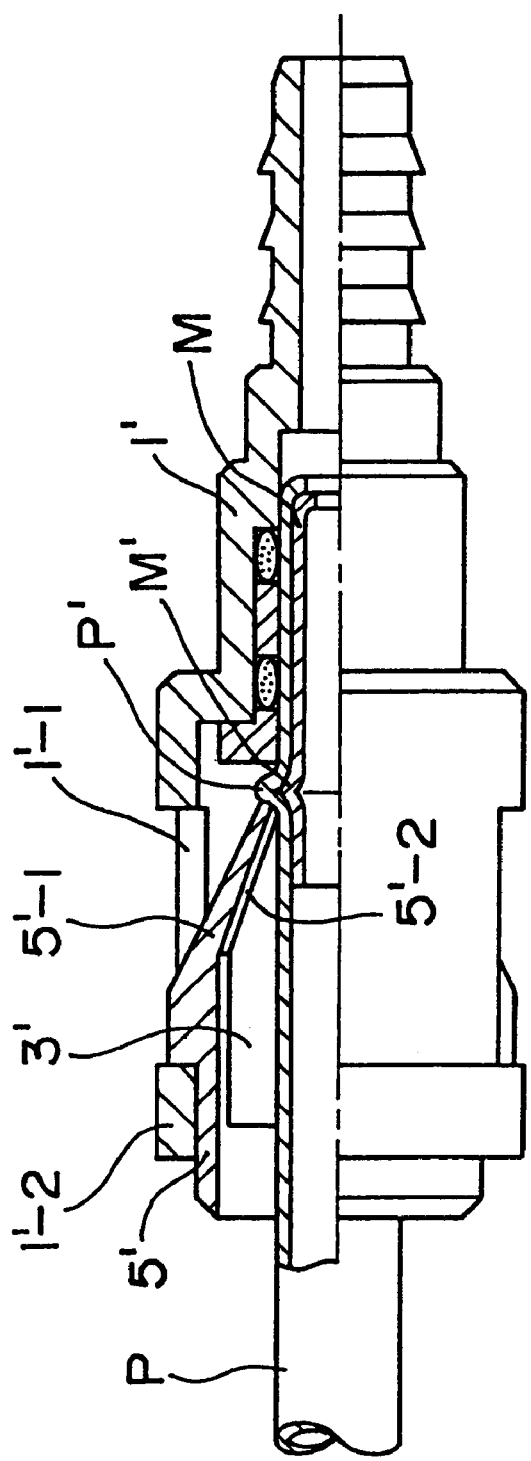
FIG. 3 is a longitudinal side view (partly in section) of a small-diameter tube connector properly connected with a tube according to another embodiment of the present invention.

To describe another embodiment of the present invention by referring to FIG. 3, there is proposed a connector which is constructed such that the shoulder of the basic portion of a separate socket 5' having inwardly-energized repulsive walls 5'-2 each in the form of a pawl wall 5'-1 is held in engagement with the edge of an engagement hole 1'-1 drilled through a radially expanded chamber 3' of the main body 1' of a resin or metallic connector and in this condition, an annular bulged wall portion P' of a resin tube P having a thin-wall metallic tube M inserted therein is brought into engagement with the pawl walls 5'-1 thereby connecting the resin tube to the connector.

Thus, it goes without saying that the present invention is applicable not only to the connector shown in FIG. 3 but also to various types of known quick connectors each having an opening in the outer peripheral wall of the main body thereof.

Further, as the materials for the resin tube P, soft polyethylene and fluorine resin may be used besides the conventionally used polyamide type resin. Further, the materials for the thin-wall metallic tube M may be properly selected as desired but aluminum, copper and ferrous materials are preferable because of their press-workability and lightness in weight. In addition, although the wall thickness of the metallic tube M varies depending on the quality, the external configuration and the wall thickness of the target resin tube, it is preferable that the wall thickness be within the range of 10 through 50% of the wall thickness of the resin tube. Further, it is absolutely necessary for the thin-wall metallic tube M to be present on the inner peripheral surface of the resin tube at a position near the annular bulged wall P' thereof. If the thin-wall metallic tube M is too long, the weight of the resin tube itself as a product increases so that a strong flow resistance is applied to the fluid flowing through the tube and the flexibility featuring the resin tube may be spoiled but when the resin tube has a bent portion, such long metallic tube has the advantage of being able to bent by using a general metallic tube bender. However, where no such bent portion is present, it is desirable that the metallic tube be inserted into the resin tube to a length of about 30 through 200 mm from the top end of the resin tube P.

Further, in the case of an automobile, it is possible to prevent the breakage of the resin tube due to an electrical spark generating from a portion of the resin tube toward the body of the automobile by such arrangement that the static electricity generating due to the friction of the fluid with the inner wall surface of the thin-wall metallic tube inserted into the resin tube is discharged to the engine or the fuel tank. This arrangement can be realized easily in such a manner that the connector main body having a conductive support inserted in the inner wall of the connecting cylinder, the conductive flexible hose and the conductive resin tube as described in the Japanese Patent Application No.H10-173991/1998 filed by the present applicant are used and the top end of the thin-wall metallic tube and the conductive support are electrically connected by means of a helical spring. For further details of such arrangement, reference is made to the above-cited Japanese Patent Application.

As described above, it is possible with the present invention to securely maintain the connecting condition of a small-diameter tube for a prolonged period of time even when the conventional quick connector is used as it is and to increase its resistance against the draw-out force applied on the connector. Further, it is possible to provide a small-diameter resin tube connecting structure to be used as a connector without increasing the size of the main body of the connector.

What is claimed is:

1. A small-diameter resin tube connecting structure used as a small-diameter tube connector, which comprises: a main body including therein a small-diameter chamber formed by the radial expansion of a communication hole defined by a connecting cylindrical wall of the top end of the main body in communication with said communication hole and having therein seal rings and bushes disposed therein and a large-diameter chamber formed in the same manner as the small-diameter chamber and having a pair of engagement holes or recessed windows formed through the outer peripheral wall thereof in opposite relationship with each other; and a socket having a plurality of inwardly energized repulsive walls each in the form of a pawl wall at the engagement holes or recessed windows, respectively, and formed integral with, or separately from, the main body of the connector whereby when a target resin tube is connected to the connector, said repulsive walls are brought into pressure-engagement with an annular bulged wall portion of the target resin tube, wherein a thin-wall metallic tube having an annular bulged wall portion similar to that of said target resin tube is inserted into at least a connecting end of said target resin tube with said thin-wall metallic tube serving as a reinforcing member, and wherein said thin-wall metallic tube has a wall thickness in the range of 10 through 50% of the wall thickness of said resin tube.

2. The small-diameter resin tube connecting structure as claimed in claim 1, wherein said resin tube and said thin wall metallic tube are caused to have an annular bulged wall portion together with said inserted thin-wall metallic tube by press-working said inserted thin-wall metallic tube in the axial direction.

3. The small-diameter resin tube connecting structure as claimed in claim 1, wherein said thin-wall metallic tube inserted into said resin tube is made of an aluminum, copper or ferrous material.

4. A small-diameter resin tube connecting structure used as a small-diameter tube connector, which comprises: a main body including therein a small-diameter chamber formed by the radial expansion of a communication hole defined by a connecting cylindrical wall of the top end of the main body in communication with said communication hole and having therein seal rings and bushes disposed therein and a large-diameter chamber formed in the same manner as the small-diameter chamber and having a pair of engagement holes or recessed windows formed through the outer peripheral wall thereof in opposite relationship with each other; and a socket having a plurality of inwardly energized repulsive walls each in the form of a pawl wall at the engagement holes or recessed windows, respectively, and formed integral with, or separately from, the main body of the connector whereby when a target resin tube is connected to the connector, said repulsive walls are brought into pressure-engagement with an annular bulged wall portion of the target resin tube, wherein a thin-wall metallic tube having an annular bulged wall portion similar to that of said target resin tube is inserted into at least a connecting end of said target resin tube with said thin-wall metallic tube serving as a reinforcing member, and wherein said thin-wall metallic tube is inserted into said resin tube to a length of about 30 through 200 mm from the top end of said resin tube.

5. The small-diameter resin tube connecting structure as claimed in claim 1, wherein said resin tube is made of polyamide resin, polyethylene resin or fluorine resin.

6. The small-diameter resin tube connecting structure as claimed in claim 1, wherein said connector main body is made of a metallic or resin material.

7. A small-diameter resin tube connecting structure comprising:
a main body having opposite first and second ends, a small-diameter chamber formed in said main body between said first and second ends, a communication hole extending from said small diameter chamber to said first end of said main body, a large diameter chamber extending from said small diameter chamber to said second end of said main body, a pair of opposed engagement holes formed transversally through said main body and into said large diameter chamber, a pair of inwardly energized repulsive pawl walls extending inwardly through the engagement holes and into the large diameter chamber, said pawl walls having inner ends spaced from one another by a selected inside diameter, a tube assembly comprising an outer tube formed from a resin material and having opposed first end and second ends, said outer tube having an inner circumferential surface, said tube assembly further comprising an inner tube formed from a metallic material and having a first end substantially adjacent said first of said outer tube and a second end spaced between the first end and second ends of the outer tube, said inner tube having an outer circumferential surface engaged with said inner circumferential surface of said outer tube, said inner and outer tubes of said tube assembly having an annular bulged wall portion formed such that said outer circumferential surface of said inner tube remains in contact with said inner circumferential surface of said outer tube through said annular bulged wall portion, said outer tube defining an outside diameter at said annular bulged wall portion that is greater than the inside diameter defined by said pawl walls, said tube assembly being inserted into said main body such that the first ends of said inner and outer tubes are in said small diameter chamber and such that said annular bulged wall portion is between the pawl walls and the first end of the main body, whereby the pawl walls retain said tube assembly in said main body and whereby the metallic material of the inner tube reinforces said tube assembly against forces between said annular bulged wall portion and said pawl walls.

* * * * *